US007298718B2

(12) United States Patent
Odenwalder et al.

(10) Patent No.: US 7,298,718 B2
(45) Date of Patent: Nov. 20, 2007

(54) CHANNEL ALLOCATIONS IN A COMMUNICATIONS SYSTEM

(75) Inventors: Joseph P. Odenwalder, Rancho Santa Fe, CA (US); Yongbin Wei, San Diego, CA (US); Edward G. Tiedemann, Jr., Concord, MA (US); Stein A. Lundby, Solana Beach, CA (US); David Puig-Oses, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 831 days.

(21) Appl. No.: 10/106,945

(22) Filed: Mar. 25, 2002

(65) Prior Publication Data

US 2003/0031149 A1 Feb. 13, 2003

Related U.S. Application Data

(60) Provisional application No. 60/289,450, filed on May 7, 2001.

(51) Int. Cl.
*H04Q 7/00* (2006.01)
(52) U.S. Cl. ............... 370/329; 370/341; 370/335; 370/342
(58) Field of Classification Search ........ 370/329, 370/335, 337, 341, 342, 347, 431, 441, 442
See application file for complete search history.

(56) References Cited

U.S. PATENT DOCUMENTS

| 5,473,612 | A | 12/1995 | Dehner, Jr. et al. ...... 370/105.4 |
| 6,289,037 | B1* | 9/2001 | Gibbons et al. ............ 375/130 |
| 6,434,717 | B1* | 8/2002 | Fujii ........................... 714/758 |
| 6,820,228 | B1* | 11/2004 | Keller ......................... 714/757 |
| 6,928,066 | B1* | 8/2005 | Moon et al. ................ 370/342 |

FOREIGN PATENT DOCUMENTS

GB    2069799    8/1981

* cited by examiner

*Primary Examiner*—Ajit Patel
(74) *Attorney, Agent, or Firm*—Kent D. Baker; Jonathan T. Velasco; Thomas R. Rouse

(57) ABSTRACT

Systems and techniques for communications include calculating a value from data, transmitting the value and data over at least one time slot, receiving the transmission, recalculating the value from the received data, and determining the number of time slots of the transmission from the calculated and recalculated values. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

50 Claims, 5 Drawing Sheets

CHANNEL ALLOCATIONS IN A COMMUNICATIONS SYSTEM

CROSS-REFERENCE TO RELATED APPLICATIONS

The present application claims priority under 35 U.S.C. § 119(e) to provisional Application 60/289,450, filed May 7, 2001, the contents of which is incorporated herein by reference.

BACKGROUND

1. Field

The present invention relates generally to communications systems, and more specifically, to systems and techniques to optimize channel allocations in a communications systems.

2. Background

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications medium. The channel allocations can take on various forms depending on the specific multi-access technique. By way of example, in FDMA systems, the total frequency spectrum is divided into a number of smaller sub-bands and each user is given its own sub-band to access the communications medium. Alternatively, in TDMA systems, each user is given the entire frequency spectrum during periodically recurring time slots. In CDMA systems, each user is given the entire frequency spectrum for all of the time but distinguishes its transmission through the use of a unique code.

CDMA is a modulation and multiple access technique based on spread-spectrum communications. In a CDMA communications system, a large number of signals share the same frequency spectrum. This is achieved by transmitting each signal with a different code that modulates a carrier, and thereby, spreads the spectrum of the signal waveform. The transmitted signals are separated in the receiver by a correlator that uses a corresponding code to despread the desired signal's spectrum. The undesired signals, whose codes do not match, are not despread in bandwidth and contribute only to noise.

The use of CDMA techniques for multiple access communications generally provides increased user capacity over traditional TDMA and FDMA techniques. As a result, more users can access a network, or communicate with one another, through one or more base stations. In CDMA communications systems, the channel allocations are based on orthogonal sequences known as Walsh codes. Theoretically, maximum capacity of the CDMA communications system can be achieved when each available Walsh code is used to spread the traffic channels between multiple users. However, as a practical matter, numerous Walsh code channels may be required to support various control channels such as the pilot channel and other commonly used control channels. These control channels can generally be thought of as overhead which tends to consume bandwidth and decrease user capacity by reducing the number of Walsh channels available for traffic. With the tremendous increase in wireless applications over the past years, there is a need for a more efficient and robust data format which reduces overhead and increases throughput. This need is not limited to CDMA communications, but applies to various other communications systems.

SUMMARY

In one aspect of the present invention, a method of communications includes calculating a value from data, transmitting the value and data over at least one time slot, receiving the transmission, recalculating the value from the received data, and determining the number of time slots of the transmission from the calculated and recalculated values.

In another aspect of the present invention, a communications system includes a base station having a channel element configured to calculate a value from data, and a transmitter configured to transmit the value and data over at least one time slot, and a subscriber station having a receiver configured to receive the transmission, and a processor configured to recalculate the value from the received data, and determine the number of time slots of the transmission from the calculated and recalculated values.

In yet another aspect of the present invention, a receiving device includes a receiver configured to receive a transmission over at least one time slot, the transmission comprising data and a value calculated from the data, and a processor configured to recalculate the value from the received data, and determine the number of time slots of the transmission from the calculated and recalculated values.

In a further aspect of the present invention, a computer-readable media embodying a program of instructions executable by a computer program performs a method of communications, the method includes receiving a transmission over at least one time slot, the transmission comprising data and a value calculated from the data, recalculating the value from the received data, and determining the number of time slots of the transmission from the calculated and recalculated values.

In yet a further aspect of the present invention, a communications system includes a base station having means for calculating a value from data, and transmission means for transmitting the value and data over at least one time slot, and a subscriber station having means for receiving the transmission, recalculation means for recalculating the value from the received data, and determination means for determining the number of time slots of the transmission from the calculated and recalculated values.

In yet another aspect of the present invention, a receiving device includes means for receiving a transmission over at least one time slot, the transmission comprising data and a value calculated from the data, recalculation means for recalculating the value from the received data, and determination means for determining the number of time slots of the transmission from the calculated and recalculated values.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In an exemplary embodiment of a communications system, data can be transmitted between two communications devices over one or more time slots. A value can be calculated from the data and included in the transmission. At the receiving end, the value can be recalculated from the data, and the number of time slots of the transmission can be determined from the recalculated value and the value embedded in the transmission. This approach tends to reduce overhead by eliminating a secondary channel often used in communications systems to identify the number of time slots occupied by the transmission.

Various aspects of the present invention will be described in the context of a CDMA communications system supporting circuit-switch voice and high speed packet data applications. However, those skilled in the art will appreciate that these inventive aspects are likewise suitable for use in various other communications environments. Accordingly, any reference to a CDMA communications system is intended only to illustrate the inventive aspects of the present invention, with the understanding that such inventive aspects have a wide range of applications.

Figure 1:
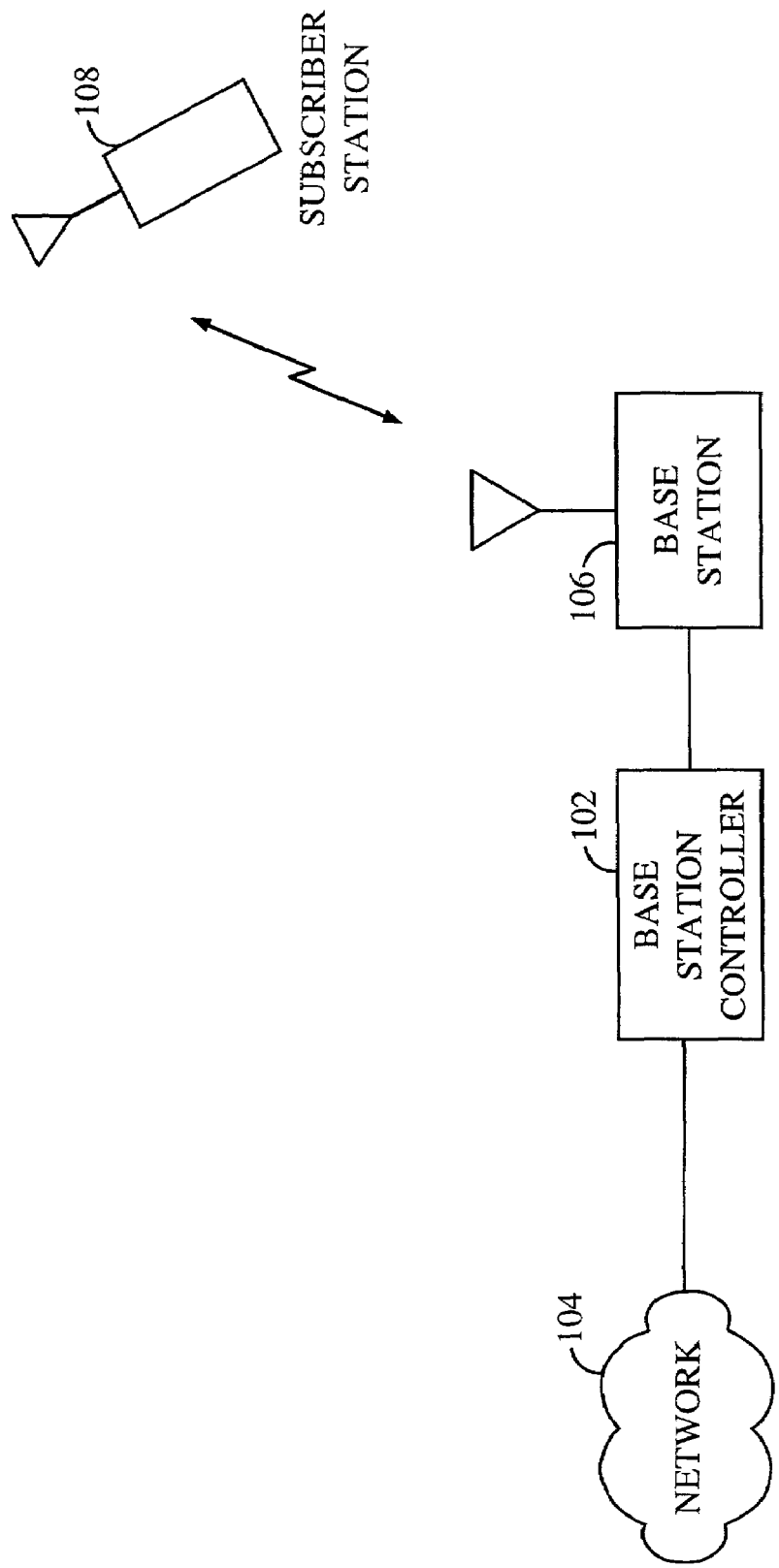
FIG. 1 is a functional block diagram of an exemplary CDMA communications system.

FIG. 1 is a simplified functional block diagram of an exemplary CDMA communications system supporting circuit-switched voice and high speed packet data applications. A base station controller 102 can be used to provide an interface between a network 104 and all base stations dispersed throughout a geographic region. The geographic region may be divided into subregions known as cells or sectors. A base station is generally assigned to serve all subscriber stations in a subregion. For ease of explanation, only one base station 106 is shown. A subscriber station 108 may access the network 104, or communicate with other subscriber stations (not shown), through one or base stations under control of the base station controller 102.

Figure 2:
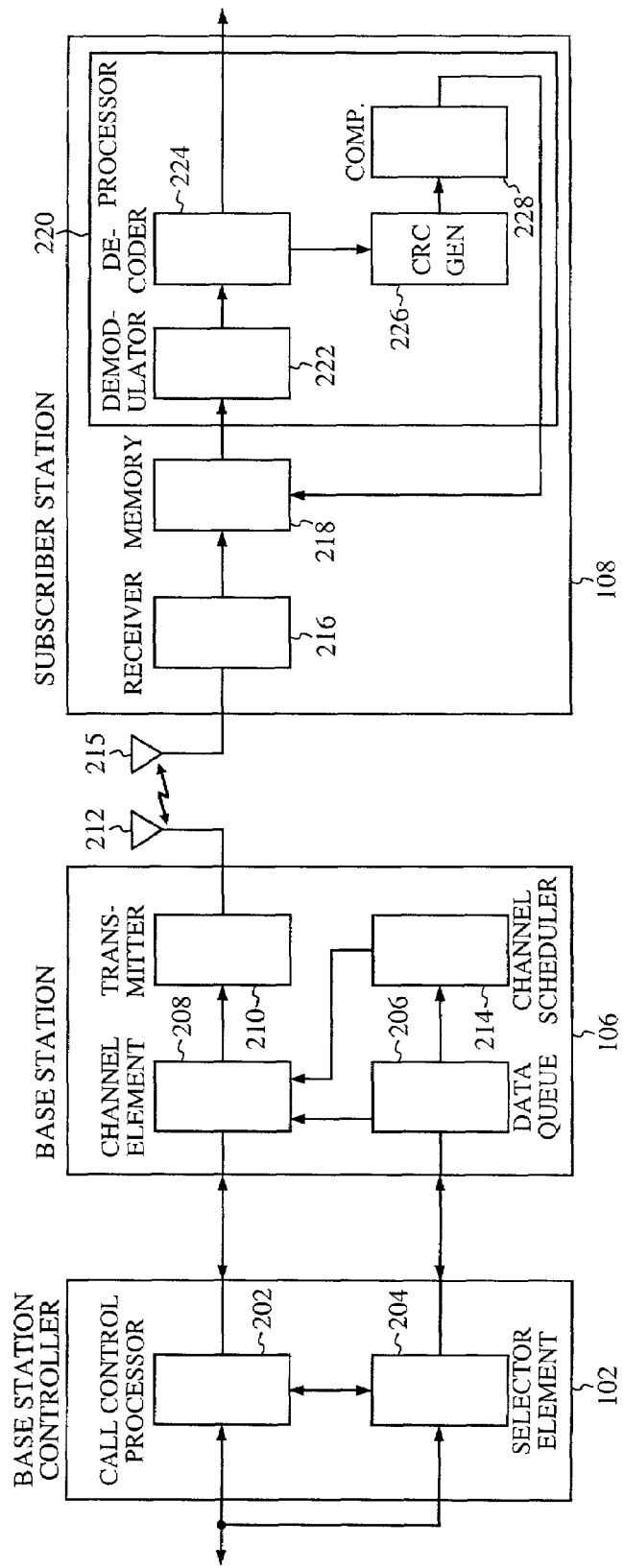
FIG. 2 is a functional block diagram illustrating the basic subsystems of the exemplary CDMA communications system of FIG. 1.

FIG. 2 is an exemplary functional block diagram illustrating the basic subsystems of the exemplary CDMA communications system of FIG. 1. The base station controller 102 contains many selector elements, although only one selector element 204 is shown for simplicity. One selector element is used to control the transmissions between one or more base stations in communication with a single subscriber station 108. When a call is initiated, a call control processor 202 can be used to establish the connection between the selector element 204 and the base station 106. The base station 106 can then assign a MAC (Media Access Controller) ID to identify communications intended for the subscriber station 108 over that connection. The assigned MAC ID can be transmitted from the base station 106 to the subscriber station 108 with the exchange of signaling messages during call set up.

The selector element 204 can be configured to receive circuit-switched voice and data from the network 104. The selector element 204 sends the circuit-switched voice and data to each base station in communication with the intended subscriber station 108. The base station 106 generates a forward link transmission that includes a forward packet data channel for high speed delivery of the data from the base station 106 to one or more subscriber stations. The forward link refers to the transmission from the base station 106 to the subscriber station 108. The forward packet data channel can be composed of any number of Walsh code subchannels depending on the demands of the circuit-switched voice and data users The forward packet data channel generally serves one subscriber station at a time in a time-division multiplexed fashion.

The base station 106 may include a data queue 206 which buffers the data from the selector element 204 before transmission to the subscriber station 108. The data from the data queue 206 can be provided to a channel element 208. The channel element 208 partitions the data into multiple data packets. Depending on the number of data packets needed to support the communications from the selector element 204, any number of Walsh code subchannels may be used. The channel element 208 then encodes the data packets using a coding process such as Turbo coding, scrambles the encoded symbols using a long pseudo-random noise (PN) sequence, and interleaves the scrambled symbols. Some or all of the interleaved symbols can then be selected to fonn data subpackets for the initial forward link transmission or retransmission. The data subpacker symbols can then be modulated by the channel element 208 using QPSK (Quadrature Phase Shift Keying), 8-PSK, 16-QAM (Quadrature Amplitude Modulation), or any other modulation scheme known in the art, demultiplexed into in-phase (I) and quadrature (Q) components and covered with distinct Walsh codes. The modulated symbols for each Walsh code subchannel can then be combined by the channel element 208 and quadrature spread using short PN code& The short PN codes are a second layer of coding that is used to isolate one subregion from another. This approach allows the re-use of Walsh codes in every subregion. The quadrature spread channel can then provided to a transmitter 210 for filtering, upconvertion, and amplification before transmission over the forward link from the base station 106 to the subscriber station 108 via an antenna 212.

The control and scheduling functions can be provided by a channel scheduler 214. The channel scheduler 214 receives the queue size from the data queue 206 and an indication of the channel quality from the subscriber station 108. With this information, the channel scheduler schedules the data subpacket size and data rate for the forward link transmission to maximize throughput and minimize transmission delay. The data packet or subpacket size is defined by the number of bits contained therein. Depending on the data packet size and the scheduled data rate, the data subpackets can be transmitted over one or more time slots. In one exemplary embodiment of a CDMA communications system, the data subpackets can be transmitted over one, two, four or eight 1.25 millisecond (ms) time slots.

The channel scheduler 214 may also schedule the modulation format of the data subpacket based on the quality of the communications channel between the base station 106 and the subscriber station 108. By way of example, in a relatively distortion free environment with little or no interference, the channel scheduler 214 may schedule a high data rate to transmit each data subpacket over one time slot with a 16-QAM modulation format. Conversely, for subscriber stations with poor channel conditions, the channel scheduler 214 may schedule a low data rate to transmit each data subpacket over eight time slots with a QPSK modulation format. The optimal combination of data rate and modulation format to maximize the throughput of the system can be readily determined by those skilled in the art.

The forward link transmission generated by the base station 106 may also include one or more forward packet data control channels associated with the forward packet data channel. Conventional high speed packet data systems with multiple time slot arrangements often utilize two forward packet data control channels: a forward primary packet data control channel and a forward secondary packet data control channel. The forward secondary packet data control channel carries information subpackets which can be used by the subscriber station to receive or decode corresponding data subpackets on the forward packet data channel. Specifically, the information subpacket includes a 6-bit MAC ID which identifies the intended subscriber station for the corresponding data subpacket, a 2-bit subpacket ID which identifies the corresponding data subpacket, a 2-bit ARQ channel ID which identifies the data packet from which the corresponding data subpacket was derived, and a 2-bit length field which indicates the corresponding data subpacket size. In a manner similar to the forward packet data channel, the information subpackets carried by the forward secondary packet data control channel can be transmitted over one or more slots to optimize communications with various subscriber stations having different channel conditions. In one exemplary embodiment of a CDMA communications system, the information subpacket can be transmitted over the forward secondary packet data control channel in one, two or four 1.25 ms time slots depending on the number of time slots occupied by the corresponding data subpacket. By way of example, the information subpacket on the forward secondary packet data control channel can be transmitted over one time slot for a one time slot data subpacket, two time slots for a two time slot data subpacket, or four time slots for a four or eight time slot data subpacket. The forward primary packet data control channel carries a subpacket which includes information that indicates the number of time slots occupied by the corresponding information subpacket carried on the forward secondary packet data control channel.

In at least one embodiment of a CDMA communications system employing multiple slot transmissions, the primary and secondary packet data control channels can be consolidated into one forward packet data control channel. In this embodiment, the number of time slots occupied by the information subpacket carried on the forward packet data control channel can be determined from subpacket itself. This can be achieved in a variety of fashions. By way of example, a cyclic redundancy check (CRC) value can be included in the information subpacket carried on the forward packet data control channel. The CRC can be calculated by performing a known algorithm on the bit sequence forming the information subpacket. At the subscriber station, a CRC check function can be performed on information subpackets addressed to the subscriber station via the MAC ID. Specifically, the CRC can be recalculated over various time slot arrangements, and the recalculated CRC values can be compared to the CRC value included in the information subpacket. The length of the information subpacket, i.e., the number of time slots occupied by the information subpacket, can then be determined from the recalculated CRC value that matches the CRC value from the information subpacket. If none of the CRC values recalculated by the subscriber station match the CRC value from the information subpacket, then the subscriber station assumes that the corresponding data subpacket was intended for another subscriber station.

Once the number of times slots occupied by the information subpacket is determined, it can be used to decode the corresponding data packet. If the subscriber station can successfully decode the data packet, which includes the current data subpacket and any previously received data subpackets for the data packet, then the subscriber station sends an acknowledgement (ACK) response to the base station. If the data packet cannot be successfully decoded, the subscriber station then sends a negative acknowledgement (NACK) response requesting additional data subpackets. The data packet may be deemed successfully decoded if the data packet CRC checks.

The CRC protected subpacket may also provide additional benefits. By way of example, increased system throughput may be realized by decreasing the false-alarm probability of the forward packet data control channel. The false-alarm probability is the probability that a subscriber station will attempt to erroneously decode a data subpacket intended for another subscriber station.

Further increases in user capacity and throughput may be achieved by expanding the length of the MAC ID from 6-bits to 8-bits to increase the number of users that can access the CDMA communications system. The exact number of bits used for the MAC ID is a matter of design and may vary depending on the overall design criteria of the communications system and the performance requirements. Regardless of the number of bits ultimately selected by the skilled artisan, an expanded MAC ID can reduce the delay and signaling overhead associated with frequent changes in active users. The expanded MAC ID length may also minimize the false-alarm probability by requiring more bits to be matched with the subscriber station MAC ID before the information subpacket is declared valid. By minimizing the false-alarm probability, the throughput of the CDMA communications system may be increased. Those skilled in the art will readily be able to assess performance tradeoffs of the system to ascertain the optimal bit length for the MAC ID to maximize user capacity and throughput.

In at least one exemplary embodiment of a CDMA communications system, a data compression algorithm can be used to minimize the overhead required to transmit the information needed for decoding the forward packet data channel. This can be achieved by establishing various forward link transmission formats and assigning a binary code to each transmission format. By way of illustration, the channel element 208 can partition the data into data packets having one of two possible sizes. Depending on the data rate scheduled by the channel scheduler 214, the data packets can be transmitted over a fixed number of Walsh subchannels with a one, two, four or eight slot format. Assuming four possible data rates that can be scheduled, one for each multiple time slot format, eight binary codes would be needed to indicate the data packet size, the data rate, and the number of time slots for the data subpacket transmission. Eight binary codes can be represented by three bits. The number of forward link transmission formats and the overhead to support it can be varied depending on the overall design parameters, and those skilled in the art will be readily be able to assess system tradeoffs to optimize performance. By way of example, the channel element 208 may be configured to support more data subpacket sizes. This approach may improve system throughput by providing an increase in the data subpacket size for higher data rates that can be supported by the subscriber station 108.

Table 1 illustrates one possible approach for transmitting the data subpackets over the forward link using twenty-eight 32-chip Walsh subchannels. In this embodiment, there are twenty-four possible forward link transmission formats with six different data packet sizes, fifteen different data rates, and three different modulation formats for transmission over one, two, four or eight time slots.

subpackets. The described exemplary data subpacket format and ID is 6-bits in length, and therefore, has sixty-four values. The first twenty-four values, i.e., $00_{HEX}$ to $17_{HEX}$, are reserved for the initial data subpacket transmission and provides various information for all data subpackets derived from the same data packet such as the data packet size, the data rate, the modulation scheme, and the number of slots occupied by each data subpacket. The initial data subpacket is transmitted repeatedly until the subscriber station acknowledges that it has been received. The next thirty-six values, i.e., $18_{HEX}$ to $3C_{Hex}$, are unused. The last three values, i.e., $3D_{HEX}$ to $3F_{HEX}$, provide a data subpacket ID for data subpackets following the initial data subpacket transmission. Since the forward link transmission format has been sent with the initial data subpacket transmission, the only information required to decode subsequent data subpackets is the data subpacket ID.

TABLE 2

| Value | Meaning |
| --- | --- |
| $00_{HEX}$ to $17_{HEX}$ | Initial Subpacket (Subpacket ID = 0) with a Format of 0 to 23 |
| $18_{HEX}$ to $3C_{HEX}$ | Reserved |
| $3D_{HEX}$ to $3F_{HEX}$ | Noninitial Subpacket with a Subpacket ID of 1 to 3 |

The exemplary compression algorithm described in connection with Table 2 may also reduce the false-alarm probability, and thereby, increase system throughput. Since more than one-half of the binary codes for the data subpacket format and ID are not used, the probability that this 6-bit

| Number of Bits per Packet | Number of 32-Chip Walsh Channels | Subpacket Data Rate (kbps) | Number of Slots per Subpacket | Modulation Order | Effective Code Rate | Number of Payload Modulation Symbols | Number of Payload Modulation Symbols per Walsh Channel | Number of Payload Binary Code Symbols |
| --- | --- | --- | --- | --- | --- | --- | --- | --- |
| 384 | 28 | 38.4 | 8 | 2 | 0.017857 | 10,752 | 384 | 21,504 |
| 384 | 28 | 76.8 | 4 | 2 | 0.035714 | 5,376 | 192 | 10,752 |
| 768 | 28 | 76.8 | 8 | 2 | 0.035714 | 10,752 | 384 | 21,504 |
| 384 | 28 | 153.6 | 2 | 2 | 0.071429 | 2,688 | 96 | 5,376 |
| 768 | 28 | 153.6 | 4 | 2 | 0.071429 | 5,376 | 192 | 10,752 |
| 1,536 | 28 | 153.6 | 8 | 2 | 0.071429 | 10,752 | 384 | 21,504 |
| 2,304 | 28 | 230.4 | 8 | 2 | 0.107143 | 10,752 | 384 | 21,504 |
| 384 | 28 | 307.2 | 1 | 2 | 0.142857 | 1,344 | 48 | 2,688 |
| 768 | 28 | 307.2 | 2 | 2 | 0.142857 | 2,688 | 96 | 5,376 |
| 1,536 | 28 | 307.2 | 4 | 2 | 0.142857 | 5,376 | 192 | 10,752 |
| 3,072 | 28 | 307.2 | 8 | 2 | 0.142857 | 10,752 | 384 | 21,504 |
| 4,224 | 28 | 422.4 | 8 | 2 | 0.196429 | 10,752 | 384 | 21,504 |
| 2,304 | 28 | 460.8 | 4 | 2 | 0.214286 | 5,376 | 192 | 10,752 |
| 768 | 28 | 614.4 | 1 | 2 | 0.285714 | 1,344 | 48 | 2,688 |
| 1,536 | 28 | 614.4 | 2 | 2 | 0.285714 | 2,688 | 96 | 5,376 |
| 3,072 | 28 | 614.4 | 4 | 2 | 0.285714 | 5,376 | 192 | 10,752 |
| 4,224 | 28 | 844.8 | 4 | 2 | 0.392857 | 5,376 | 192 | 10,752 |
| 2,304 | 28 | 921.6 | 2 | 2 | 0.428571 | 2,688 | 96 | 5,376 |
| 1,536 | 28 | 1,228.8 | 1 | 2 | 0.571429 | 1,344 | 48 | 2,688 |
| 3,072 | 28 | 1,228.8 | 2 | 2 | 0.571429 | 2,688 | 96 | 5,376 |
| 4,224 | 28 | 1,689.6 | 2 | 2 | 0.785714 | 2,688 | 96 | 5,376 |
| 2,304 | 28 | 1,843.2 | 1 | 3 | 0.571429 | 1,344 | 48 | 4,032 |
| 3,072 | 28 | 2,457.6 | 1 | 4 | 0.571429 | 1,344 | 48 | 5,376 |
| 4,244 | 28 | 3,379.2 | 1 | 4 | 0.785714 | 1,344 | 48 | 5,376 |

Table 2 illustrates an exemplary compression algorithm for specifying the data subpacket format and ID of Table 1. The data subpacket format specifies one of the forward link transmission formats for a fixed number of available Walsh subchannels and the data subpacket ID identifies the data sequence, if corrupted by the communications channel, will match a valid sequence is less than one-half. Those skilled in the art will be readily able to ascertain system tradeoffs to determine the optimal compression algorithm to enhance system performance. By way of example, the bit sequence can be expanded to increase the number of transmission formats available and/or the throughput of the system at the cost of additional overhead. Alternatively, the compression algorithm can be fixed at 6-bits with additional transmission formats being assigned to the unused values at the risk of a higher false-alarm rate. Conversely, the number of transmission formats can be reduced resulting in more unused values which tends to decrease the false-alarm probability.

The compression algorithm for specifying the data subpacket format and ID of Table 1 can be reduced twofold by using the slot duration of the information subpacket to specify the slot duration of the corresponding data subpacket. By way of example, the information subpacket on the forward packet data control channel can be transmitted over one time slot for a one time slot data subpacket, two time slots for a two time slot data subpacket, or four time slots for a four or eight time slot data subpacket. This approach reduces the number of possible subpacket formats from twenty-four to twelve. As a result, only the first twelve values, i.e., $00_{HEX}$ to $0C_{HEX}$, are required for the initial data subpacket transmission leaving the next forty-eight values, i.e., $0D_{HEX}$ to $3C_{HEX}$, unused. With more unused values in the compression algorithm, the false-alarm probability tends to decrease. Alternatively, the bit length of the compression algorithm can be reduced to save overhead.

The channel element 208 can be used to generate the information for the forward packet data control channel. Based on the number of Walsh subchannels available for the forward packet data channel, the channel element 208 generates a 6-bit subpacket format and ID for the initial information subpacket transmission as a function of the data subpacket size, the scheduled data rate, and the scheduled modulation format. This information can be obtained from the channel scheduler 214. The channel element 208 also generates the 6-bit subpacket format and ID for the information subpackets that follow the initial transmission. The channel element 208 generates an information subpacket payload by packaging the 6-bit subpacket format and ID with a 2-bit ARQ ID identifying the data packet from which the corresponding data subpacket was derived, and an 8-bit MAC ID identifying the intended subscriber station of the information subpacket.

The channel element 208 can be implemented in electronic hardware, in computer software, or in a combination of the two. The channel element 208 may be implemented with a general or special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform one or more of the functions described herein. In one exemplary embodiment of the channel element 208, the channel element functions can be performed with a general purpose processor such as a microprocessor, or a special purpose processor such as a programmable DSP having an embedded communications software layer to implement the channel element functions. In this embodiment, the communications software layer can be used to invoke various encoders, modulators and supporting functions to accommodate various multiple slot transmissions.

Figure 3:
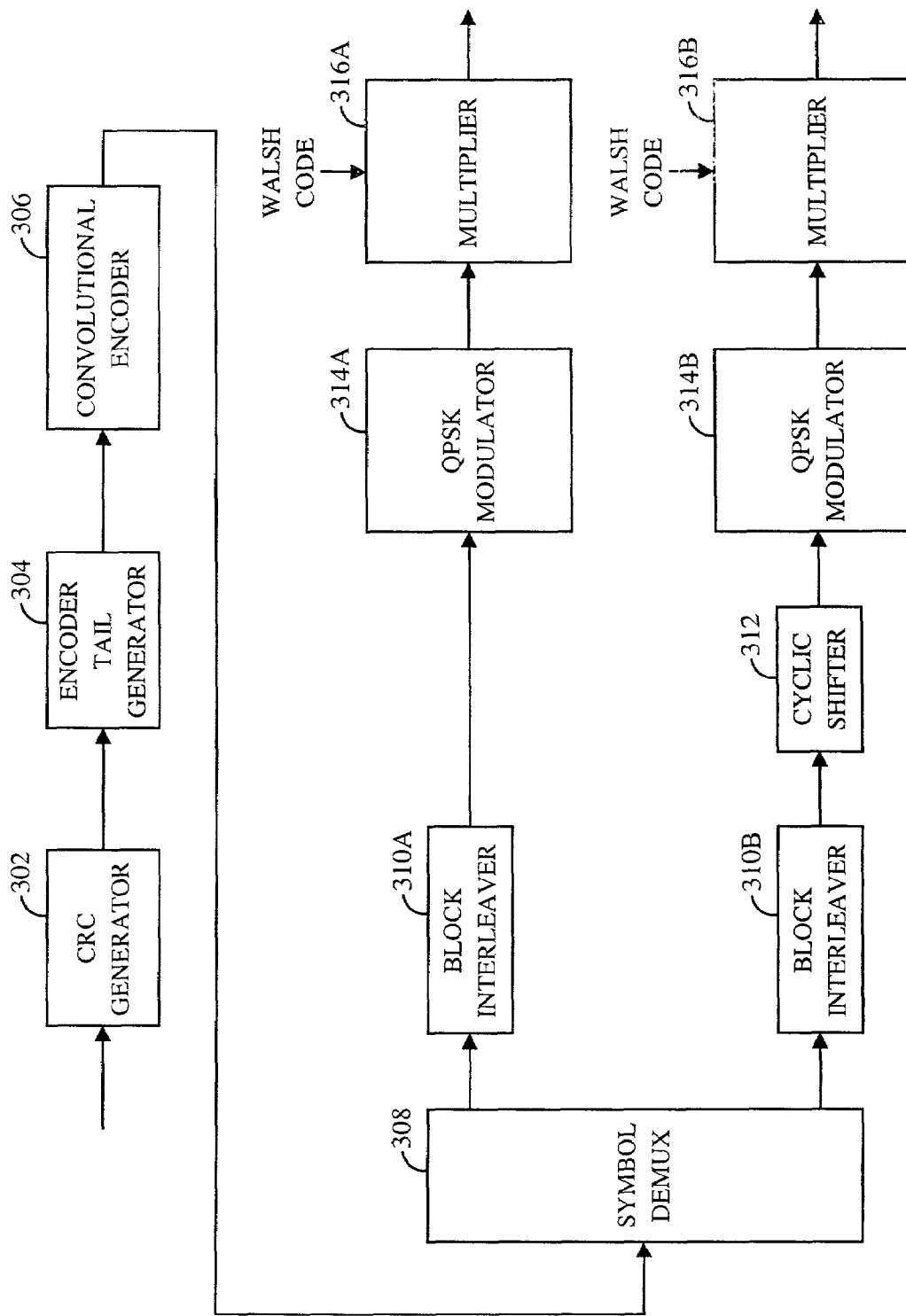
FIG. 3 is a functional block diagram illustrating an exemplary channel element configured to generate information subpackets having a one time slot format.

FIG. 3 is a functional block diagram of a channel element configuration for generating an exemplary forward packet data control channel for a one slot transmission. In this configuration, the 16-bit payload is provided to a CRC generator 302. The CRC generator 302 can be used to calculate the CRC value over the entire payload or any portion thereof. By calculating the CRC value over only a portion of the payload, a reduction in computational complexity may be achieved. The CRC value can be any number of bits depending on the design parameters. In the described exemplary embodiment, the CRC generator 302 appends 8-bits to the payload.

The 24-bit CRC protected payload can be provided to an encoder tail generator 304. The encoder tail generator 304 generates a sequence of bits that is appended to the end of the payload. The bit sequence that makes up the tail is used to ensure that decoder at the subscriber station is provided with a sequence that ends at a known state, thus facilitating accurate decoding. An 8-bit tail can be generated by the tail generator, however, as those skilled in the art will readily recognize, the tail can be any length.

The 32-bit CRC protected payload with the encoder tail can be provided to a convolutional encoder 306. The convolutional encoder 306 provides forward error correction capability at the subscriber station and can be implemented with any code rate and constraint length depending on the particular design parameters and the overall system constraints. In the exemplary embodiment shown in FIG. 3, the convolutional coding is performed at a ⅓ rate with a constraint length of 9. As a result, the 32-bit sequence input to the convolutional encoder 306 is encoded into a 96-symbol sequence. Convolutional encoding is well known, and those skilled in the art will readily be ascertained performance tradeoffs to determine the appropriate rate and constraint length to optimize performance.

The 96-symbol sequence generated by the convolutional encoder 306 can be coupled to a demultiplexer 308 which demultiplexes the symbols into two 48-symbol sequences. The 48-symbol sequence results in a 38.4 ksps (kilo-symbols per second) rate for a one slot transmission having a duration of 1.25 ms.

Various processing techniques can be applied to the two 48-symbol sequences to minimize the affect of burst errors on the ability of the decoder at the subscriber station to decode the symbol sequence. By way of example, the two 48-symbol sequences from the demultiplexer 308 can be provided to respective block interleavers 310a and 310b which alters the sequence of the symbols. The two interleaved 48-symbol sequences can then be shifted in time with respect to one another by a half-slot. This can be achieved with a cyclic shifter 312 that shifts the 48-symbol sequence from one of the block interleavers 310b in time by 24 symbols.

The symbol sequence from the block interleaver 310a and the symbol sequence from the cyclic shifter 312 can be provided to respective modulators which may support various modulation schemes such as QPSK, 8-PSK, 16-QAM, or any other modulation scheme known in the art. In the described exemplary embodiment, two QPSK modulators 314a and 314b, one for each 48-symbol sequence, are used. The modulated symbols from each of the modulators 314a and 314b can then be separated into their respective I and Q components and covered with a distinct Walsh code by multipliers 316a and 316b before being combined with the forward packet data channel and other Walsh subchannels. The combined Walsh subchannels can then be quadrature spread using the short PN codes and coupled to the transmitter 210 for filtering, upconvertion, and amplification before transmission over the forward link from the base station 106 to the subscriber station 108 (see FIG. 2).

Alternatively, the forward packet data control channel can be transmitted over a single Walsh subchannel to conserve resources during periods of high demand among the packet data users. With this approach, the demultiplexer 308 can be configured to puncture 48 symbols from the 96-symbol sequence generated by the convolution encoder 306. The nonpunctured or remaining 48 symbols can be interleaved, modulated, separating into their respective I and Q components, and spread with a distinct Walsh code as shown in the upper demultiplexed symbol sequence of FIG. 3. With this approach, the block interleaver 310*b*, the cyclic shifter 312, the modulator 314*b*, and the multiplier 316*b* are not used.

Figure 4:
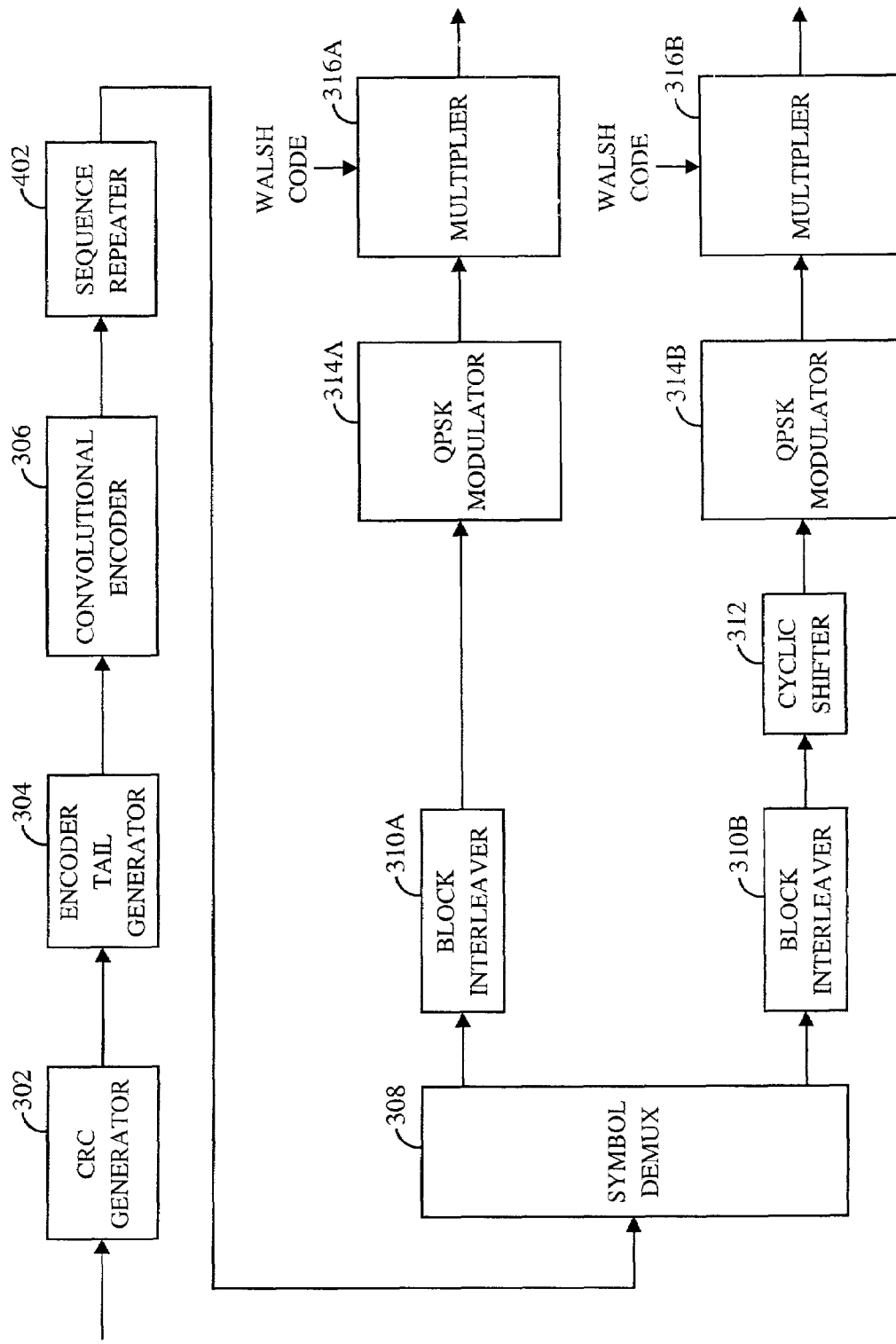
FIG. 4 is a functional block diagram illustrating an exemplary channel element configured to generate information subpackets having a two time slot format.

FIG. 4 is a functional block diagram of a channel element configuration for generating an exemplary forward packet data control channel for a two slot transmission. In a manner similar to the one slot transmission format, the 16-bit payload can be appended with an 8-bit CRC value produced by the CRC generator 302 and an 8-bit encoder tail produced by the encoder tail generator 304. The resultant 32-bit sequence can be encoded with the convolutional encoder 306 at a ⅓ rate with a constraint length of 9 to produce a 96-symbol sequence.

The main difference between the one and two slot transmission formats is the addition of a sequence repeater 402 following the convolutional encoder 306 to produce the two slot transmission format. In the described exemplary embodiment, the sequence repeater 402 is positioned at the output of the convolutional encoder 306, however, the sequence repeater 402 could alternatively be positioned downstream. The sequence repeater 402 can be configured to repeat the symbol sequence as many times as desired depending on the system requirements. By way of example, the 96-symbol sequence from the convolutional encoder 306 can be repeated twice to produce a 192-symbol sequence for a two slot transmission. Alternatively, the 96-symbol sequence from the convolutional encoder 306 could be repeated four times to produce a 384-symbol sequence for a four slot transmission. The repetition number can be preset by the designer, or alternatively programmed either manually or on the fly in an automated fashion. In the described exemplary embodiment of FIG. 4, the repetition number is set at two resulting in a 192-symbol sequence.

The 192-symbol sequence can be coupled to the demultiplexer 308 which demultiplexes the symbols into two 96-symbol sequences to support a 38.4 ksps symbol rate for a two slot transmission having a 1.25 ms duration. The two 96-symbol sequences can then be provided to their respective block interleavers 310*a* and 310*b* with one interleaved symbol sequence being shifted one time slot with respect to the other interleaved symbol sequence by the cyclic shifter 312. This can be achieved by configuring the cyclic shifter 312 to shift the 96-symbol sequence from one of the block interleavers 310*b* in time by 48 symbols.

The symbol sequence from the block interleaver 310*a* and the symbol sequence from the cyclic shifter 312 can be provided to their respective modulators 314*a* and 314*b*. The modulated symbols from each modulator 314*a* and 314*b* can then be separated into their I and Q components and covered with a distinct Walsh code with the multipliers 316*a* and 316*b* before being combined with the forward packet data channel and other Walsh subchannels. The combined Walsh subchannels can then be quadrature spread using the short PN codes, and provided to the transmitter for filtering, upconversion, and amplification before transmission over the forward link from the base station 106 to the subscriber station 108 (see FIG. 2).

Alternatively, the forward packet data control channel can be transmitted over a single Walsh subchannel. This can be accomplished in a variety of fashions. By way of example, the demultiplexer 308 can be configured to puncture 96 symbols of the 192-symbol sequence from the sequence repeater 402. The nonpunctured or remaining 96 symbols can then be interleaved, modulated, separated into their I and Q components, and spread with a distinct Walsh code. With this approach, the block interleaver 310*b*, the cyclic shifter 312, the modulator 314*b*, and the multiplier 316*b* are not used.

Further reductions in computational complexity for a single Walsh subchannel transmission can be achieved by simply eliminating the sequence repeater 402. With this approach, the 96-symbol sequence from the convolutional encoder 306 can be provided directly to the block interleaver 310*a*. As a consequence, more encoder functions can be eliminated than with the previous approach discussed earlier including the sequence repeater 402, the block interleaver 310*b*, the cyclic shifter 312, the modulator 314*b*, and the multiplier 216*b*.

Figure 5:
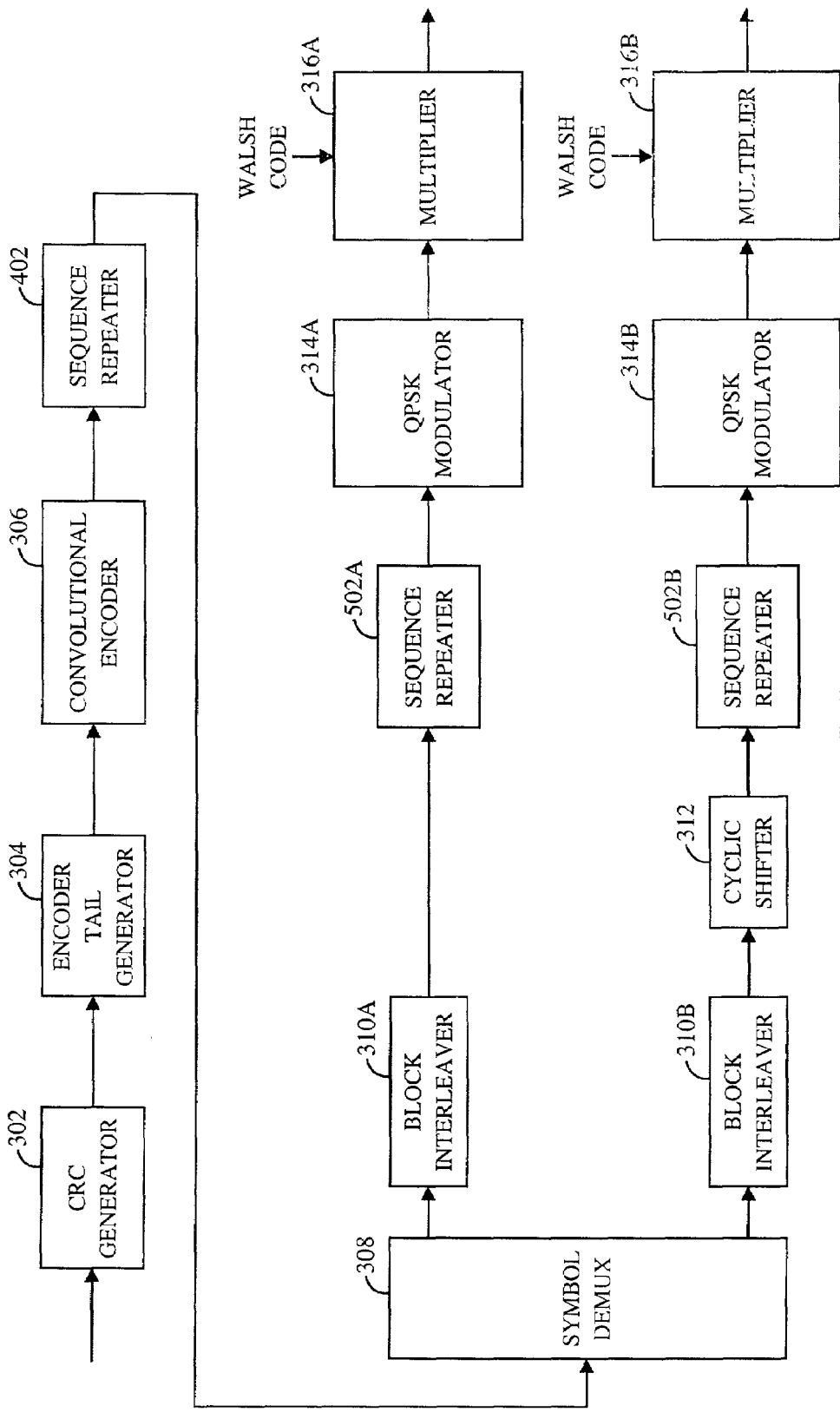
FIG. 5 is a functional block diagram illustrating an exemplary channel element configured to generate information subpackets having a four-time slot format.

FIG. 5 is a functional block diagram of a channel element configuration for generating an exemplary forward packet data control channel for a four slot transmission. In a manner similar to the one and two slot transmission formats, the 16-bit payload can be appended with an 8-bit CRC value produced by the CRC generator 302 and an 8-bit tail produced by the encoder tail generator 304. The resultant 32-bit sequence can be encoded with the convolutional encoder 306 at a ⅓ rate with a constraint length of 9 to produce a 96-symbol sequence.

The 96-symbol sequence can be provided to the sequence repeater 402. The repetition number of the sequence repeater 402 can be set at four to produce a 384-symbol sequence for a four slot transmission. Alternatively, as illustrated in the exemplary embodiment of FIG. 5, the repetition number of the sequence repeater 402 can be set at two to produce a 192-symbol sequence with a pair of sequence repeaters 502*a* and 502*b* downstream of the demultiplexer 308.

The demultiplexer 308 demultiplexes the 192-symbol sequence into two 96-symbol sequences. The two 96-symbol sequences can be provided to their respective block interleavers 310*a* and 310*b* with one interleaved symbol sequence being shifted in time with respect to the other interleaved symbol sequence by one time slot with the cyclic shifter 312. This can be achieved by shifting the 96-symbol sequence from one of the block interleavers 310*b* in time by 48 symbols.

The symbol sequence from the block interleaver 310*a* and the symbol sequence from the cyclic shifter 312 can be provided to their respective sequence repeaters 502*a* and 502*b*. The sequence repeaters 502*a* and 502*b* can be configured to repeat their respective symbol sequences twice to produce two 192-symbol sequences to support a 38.4 ksps symbol rate for a four slot transmission having a 1.25 ms duration.

The symbol sequences from the sequence repeaters 502*a* and 502*b* can be provided to their respective modulators 314*a* and 314*b*. The modulated symbols from each modulator 314*a* and 314*b* can then be separated into their I and Q components and covered with a distinct Walsh code with the multipliers 316*a* and 316*b* before being combined with the forward packet data channel and other Walsh subchannels. The combined Walsh subchannels can then be quadrature spread using the short PN codes, and provided to the transmitter 210 for filtering, upconversion, and amplification before transmission over the forward link from the base station 106 to the subscriber station 108 (see FIG. 2).

The configuration of the channel element 208 can further be arranged to accommodate a four slot transmission using a single Walsh subchannel by eliminating the sequence repeater 402 and providing the 192-symbol sequence from the convolutional encoder 306 directly to the block interleaver 310a before being repeated, modulated, separated into its I and Q components, and spread with a distinct Walsh code. The sequence repeaters 402 and 502b, the demultiplexer 308, the block interleaver 310b, the cyclic shifter 312, the modulator 314b, and the multiplier 316b are not used with this approach. Alternatively, the sequence repeater 502a following the block interleaver 310a can be eliminated instead of the sequence repeater 402 following the convolutional encoder 306.

In yet another approach for a single Walsh subchannel transmission having a four slot format, the demultiplexer 308 can be configured to puncture 96 symbols from the 192-symbol sequence from the sequence repeater 402. The nonpunctured or remaining 96 symbols can then be interleaved, repeated twice to generate a 192-symbol sequence, modulated, separated in its I and Q components, and spread with a distinct Walsh code. Those skilled in the art will readily be able to ascertain the optimal configuration of the channel element 208 to maximize throughput and minimize the false-alarm probability.

Returning to FIG. 2, the forward link transmission from the base station 106 is received by an antenna 215 at the subscriber station 108. The received signal may be routed from the antenna 215 to a receiver 216. The receiver filters and amplifies the signal, down converts the signal to baseband, and quadrature demodulates the baseband signal. The baseband signal can then be sampled and stored in memory 218. The memory 218 should be sufficiently sized to store enough samples, or chips, to cover the maximum allowable number of time slots for a forward link subpacket transmission.

In an exemplary CDMA communications system, the chips are released from the memory 218 to a processor 220 in one, two, or four time slot formats. The processor 220 can be configured to perform numerous functions some of which are illustrated in FIG. 2 by a demodulator 222, an decoder 224, a CRC generator 226, and a comparator 228. These functions may be implemented directly in hardware, in software executed by the processor, or in a combination of the two. The processor may be implemented with a general or special purpose processor, a DSP, an ASIC, a FPGA or other programmable logic device, discrete gate or transistor logic, discrete hardware components, or any combination thereof designed to perform one or more of the aforesaid functions. As those skilled in the art will appreciate, a separate processor can be used to perform each function, or alternatively, multiple functions can be partitioned among any number of processors.

To reduce computation complexity and conserve processor resources, one time slot worth of chips are initially released from the memory 218 to the demodulator 222 where they are quadrature demodulated with the short PN codes and despread into symbols using Walsh codes. The symbol sequences for the forward packet data control channel can then be demodulated using QPSK, 8-PSK, 16-QAM, or any other modulation scheme employed by the base station 106. The demodulated symbol sequences can be provided to the decoder 224 which performs the inverse of the signal processing functions done at the base station, specifically the de-interleaving and decoding.

Assuming that the decoded bit sequence includes the MAC ID for the subscriber station, the decoded bit sequence can then be provided to a CRC generator 226. The CRC generator 226 generates a CRC value and compares the locally generated CRC value with the decoded CRC value embedded in the forward link transmission with the comparator 228. The results of the comparison are used to determine whether the information subpacket carried on the forward packet data control channel is one time slot. If the locally generated CRC value matches the decoded CRC value embedded in the forward link transmission, the information subpacket is determined to be one time slot in length and the payload can be used by the processor 220 to decode the corresponding data subpacket. Conversely, if the locally generated CRC value does not match the decoded CRC value embedded in the forward link transmission, then the processor 220 releases two time slots worth of chips from the memory 218 for demodulation, decoding and CRC check functions. This process continues until the processor 220 finds a set of chips spanning over one, two, or four time slots in which the locally generated CRC value matches the decoded CRC value embedded in the forward link transmission. If none of the locally generated CRC values match the decoded CRC value embedded in the forward link transmission, the corresponding data packet is assumed to be intended for another subscriber station.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro controller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention: Thus, the present invention is not intended to be limited to the embodiments shown herein but is to be accorded the widest scope consistent with the principles and novel features disclosed herein.

What is claimed is:

1. A method of communicating, comprising:
consolidating a primary and a secondary packet control channel into one packet control channel comprising:
calculating a value from data, wherein said data comprises information subpackets addressed to a subscriber station via MAC ID;
transmitting the value and data over at least one time slot;
receiving a transmission;
recalculating the value from the received data; and
determining the number of time slots of the transmission from the calculated and recalculated values.

2. The method of claim 1 wherein the determination of the number of time slots of the transmission comprises comparing the calculated and recalculated values.

3. The method of claim 2 wherein the step of recalculating the value comprises recalculating over a plurality of different numbers of time slots until the calculated and recalculated values compare.

4. The method of claim 1 wherein the value comprises a cyclic redundancy check.

5. The method of claim 1 further comprising encoding the value and data before the transmission.

6. The method of claim 5 further comprising adding an encoder tail to the value and the data, and encoding the value, data and encoder tail before the transmission, wherein said encoder tail is 8 bits, said value is 8 bits and said data is 16 bits.

7. The method of claim 5 further comprising demultiplexing the encoded value and data into first and second sequences, and spreading each of the first and second sequences with a different code before the transmission.

8. The method of claim 7 further comprising shifting the one of the first and second sequences in time before the transmission.

9. The method of claim 1 further comprising repeating the value and data twice before the transmission, wherein the transmission comprises transmitting the repeated value and data over two time slots.

10. The method of claim 1 further comprising repeating the value and data four times before the transmission, wherein the transmission comprises transmitting the repeated value and data over four time slots.

11. The method of claim 1 further comprising repeating the value and data twice, demultiplexing the repeated value and data into a first sequence on a first channel and a second sequence on a second channel, and repeating each of the first and second sequences twice, wherein the transmission comprises transmitting each of the repeated first and second sequences on their respective first and second channels over four time slots.

12. A communications system, comprising:
a base station having a channel element configured to calculate a value from data, and a transmitter configured to transmit the value and data over at least one time slot; and
a subscriber station having a receiver configured to receive a transmission, and a processor configured to consolidate a primary and a secondary packet control channel into one packet control channel comprising recalculation of the value from the received data, and determination of the number of time slots of the transmission from the calculated and recalculated values.

13. The communications system of claim 12 wherein the processor is further configured to determine the number of time slots of the transmission by comparing the calculated and recalculated values.

14. The communications system of claim 13 wherein the processor is further configured to recalculate the value of the received data by performing the recalculation over a plurality of different numbers of time slots until the calculated and recalculated values compare.

15. The communications system of claim 12 wherein the value comprises a cyclic redundancy check.

16. The communications system of claim 12 wherein the channel element further comprises an encoder configured to encode the value and data before the transmission.

17. The communications system of claim 16 wherein the channel element further comprises an encoder tail generator configured to add an 8-bit encoder tail to the 8-bit CRC value and 16-bit data, the encoder being further configured to encode the 8-bit value, 16-bit data and 8-bit encoder tail before the transmission wherein said data comprises information subpackets addressed to a subscriber station via MAC ID.

18. The communications system of claim 16 wherein the channel element further comprises a demultiplexer configured to demultiplex the encoded value and data into first and second sequences, and a multiplier configured to spread each of the first and second sequences with a different code before the transmission.

19. The communications system of claim 18 wherein the channel element further comprises a shifter configured to shift one of the first and second sequences in time before the transmission.

20. The communications system of claim 12 wherein the channel element further comprises a repeater configured to repeat the value and data twice before the transmission, and wherein the transmitter is further configured to transmit the repeated value and data over two time slots.

21. The communications system of claim 12 wherein the channel element further comprises a first repeater configured to repeat the value and data twice, a demultiplexer configured to demultiplex the repeated value and data into a first sequence on a first channel and a second sequence on a second channel, a second repeater configured to repeat the first sequence twice, and a third repeater configured to repeat the second sequence twice, and wherein the transmitter is further configured to transmit each of the repeated first and second sequences on their respective first and second channels over four time slots.

22. A receiving device, comprising:
a receiver configured to receive a transmission over at least one time slot, the transmission comprising data and a value calculated from the data; and
a processor configured to consolidate a primary and a secondary packet control channel into one packet control channel comprising recalculation of the value from the received data, and determination of the number of time slots of the transmission from the calculated and recalculated values.

23. The receiving device of claim 22 wherein the processor is further configured to determine the number of time slots of the transmission by comparing the calculated and recalculated values.

24. The receiving device of claim 23 wherein the processor is further configured to recalculate the value of the received data by performing the recalculation over a plurality of different numbers of time slots until the calculated and recalculated values compare.

25. The receiving device of claim 23 further comprising memory configured to store the received value and data, a demodulator configured to demodulate the value and data released from the memory, a decoder configured to decode the demodulated value and data, the demodulated value and data being coupled to the processor to recalculate the value from the demodulated data and compare the demodulated value with the recalculated value.

26. The receiving device of claim 25 wherein the processor is further configured to control the release of the received value and data from memory as a function of the comparison.

27. The receiving device of claim 22 wherein the value comprises a cyclic redundancy check.

28. Computer-readable media embodying a program of instructions executable by a computer to perform a method of communications, the method comprising:
consolidating a primary and a secondary packet control channel into one packet control channel comprising:
receiving a transmission over at least one time slot, the transmission comprising data and a value calculated from the data;
recalculating the value from the received data; and
determining the number of time slots of the transmission from the calculated and recalculated values.

29. The computer-readable media of claim 28 wherein the determination of the number of time slots of the transmission comprises comparing the calculated and recalculated values.

30. The computer-readable media of claim 29 wherein the recalculation of the value comprises performing the recalculation over a plurality of different numbers of time slots until the calculated and recalculated values compare.

31. The computer-readable media of claim 28 wherein the value comprises a cyclic redundancy check.

32. A communications system, comprising:
a base station having means for calculating a value from data, and transmission means for transmitting the value and data over at least one time slot; and
a subscriber station having means for consolidating a primary and a secondary packet control channel into one packet control channel, reception means for receiving the transmission, recalculation means for recalculating the value from the received data, and determination means for determining the number of time slots of the transmission from the calculated and recalculated values.

33. The communications system of claim 32 wherein the determination means determines the number of time slots of the transmission by comparing the calculated and recalculated values.

34. The communications system of claim 33 wherein the recalculation means recalculates the value of the received data by performing the recalculation over a plurality of different numbers of time slots until the calculated and recalculated values compare.

35. The communications system of claim 32 wherein the value comprises a cyclic redundancy check.

36. The communications system of claim 32 further comprising encoder means for encoding the value and data before the transmission.

37. The communications system of claim 36 further comprising means for adding an 8-bit encoder tail to the 8-bit value and 16-bit data, wherein the encoder means encodes the 8-bit value, 16-bit data and 8-bit encoder tail before the transmission, wherein said data comprises information subpackets addressed to a subscriber station via MAC ID.

38. The communications system of claim 36 further comprising means for demultiplexing the encoded value and data into first and second sequences, and means for spreading each of the first and second sequences with a different code before the transmission.

39. The communications system of claim 38 further comprising means for shifting one of the first and second sequences in time before the transmission.

40. The communications system of claim 32 further comprising means for repeating the value and data twice before the transmission, and wherein the transmission means transmits the repeated value and data over two time slots.

41. The communications system of claim 32 further comprising means for repeating the value and data twice, means for demultiplexing the repeated value and data into a first sequence on a first channel and a second sequence on a second channel, means for repeating the first sequence twice, and means for repeating the second sequence twice, and wherein the transmission means transmits each of the repeated first and second sequences on their respective first and second channels over four time slots.

42. A receiving device, comprising:
consolidating a primary and a secondary packet control channel into one packet control channel comprising:
means for receiving a transmission over at least one time slot, the transmission comprising data and a value calculated from the data;
recalculation means for recalculating the value from the received data; and
determination means for determining the number of time slots of the transmission from the calculated and recalculated values.

43. The receiving device of claim 42 wherein the determination means determines the number of time slots of the transmission by comparing the calculated and recalculated values.

44. The receiving device of claim 43 wherein the recalculation means recalculates the value of the received data by performing the recalculation over a plurality of different numbers of time slots until the calculated and recalculated values compare.

45. The receiving device of claim 42 further comprising means for storing the received value and data, means for demodulating the value and data released from the memory, and means for decoding the demodulated value and data, wherein the recalculating means recalculates the value from the demodulated data and the determination means compares the demodulated value with the recalculated value.

46. The receiving device of claim 45 further comprising means for releasing the received value and data from memory as a function of the comparison.

47. The receiving device of claim 42 wherein the value comprises a cyclic redundancy check.

48. A method of communicating, comprising:
consolidating a primary and a secondary packet control channel into one packet control channel comprising:
receiving a transmission over at least one time slot, the transmission comprising data and a value calculated from the data;
recalculating the value from the received data; and
determining the number of time slots of the transmission from the calculated and recalculated values.

49. The method of claim 48 wherein determining the number of time slots of the transmission comprises comparing the calculated and recalculated values.

50. The method of claim 3 further comprising the step of repeating a symbol sequence comprising:
puncturing symbols from a symbol sequence,
interleaving non-punctured of said symbols; and
repeating said non-punctured symbols, whereby a multi-slot transmission is generated.

* * * * *